Figure 1:
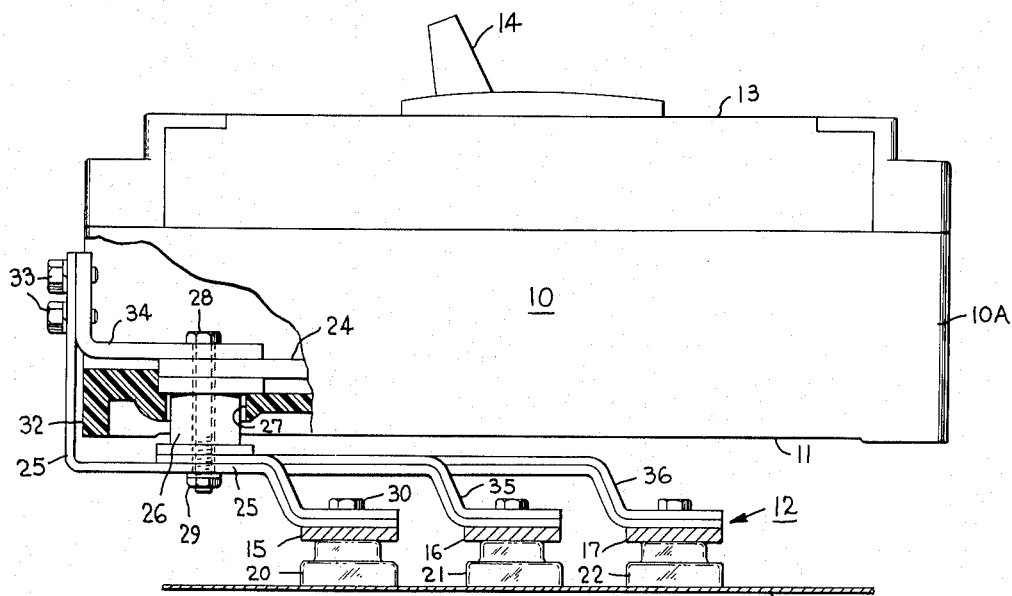

Aug. 31, 1965  G. E. GAUTHIER  3,204,150
TERMINAL CONNECTIONS FOR CIRCUIT PROTECTIVE DEVICES
Filed Oct. 7, 1963

INVENTOR.
GEORGE E. GAUTHIER
BY Robert T. Casey
ATTORNEY

_United States Patent Office_

3,204,150
Patented Aug. 31, 1965

---

3,204,150
TERMINAL CONNECTIONS FOR CIRCUIT PROTECTIVE DEVICES
George E. Gauthier, Plainville, Conn., assignor to General Electric Company, a corporation of New York
Filed Oct. 7, 1963, Ser. No. 314,239
4 Claims. (Cl. 317—119)

This invention relates to electrical connections for circuit protective devices and more particularly to terminal connections for extending the current-varying capabilities of circuit protective devices mounted within standardized enclosures.

In the control of electrical equipment, it is common to employ certain combinations of switchgear and other circuit protective devices in a panel assembly wherein power is taken from a basic bus assembly through the circuit protective device for application to a selected load. The panel assembly often has bus bars grouped in a central or back portion of an enclosure with modular circuit breakers with rectangular insulating casings, mounted in one or more vertical arrays in front of the bus bars. Electrical connections between the bus bars and the circuit breakers are typically made by conductors extending through the rear of the casings.

The point of connection of such conductors to the breaker is likely to be a "hot spot" or high temperature area because of (1) heat conducted thereto from the adjacent heater element or bimetallic strip in the breaker, and (2) the resistance of the joint. The temperature of this spot constitutes a limiting factor on the current-carrying capacity of the breaker.

This invention has as an object the provision of a novel form of terminal connection for enclosed circuit protective devices to increase the current-carrying capability of the devices and to promote more effective heat dissipation therefrom, thereby to permit the application of basic circuit protective devices to a wider range of loads.

Stated otherwise, it is an object of this invention to promote greater economies in the use of electrical load-controlling equipment by providing novel electrical connections for enclosed circuit protective devices to permit such devices to operate at lower temperatures in the upper regions of their current ratings.

It is a further object of the invention to provide a circuit protective device enclosure with novel electrical connections which make effective and efficient utilization of available space in and around the enclosure to dissipate the heat generated within the device.

By way of a brief summary of a preferred embodiment of the invention, the invention will be described as used in conjunction with an electric circuit breaker each pole of which has associated with it an elongated electrically conductive riser extending from the inside of the breaker enclosure to the outside through a back wall thereof. For each pole of the circuit breaker an electrically conductive strap is provided at the outside rear of the enclosure connecting the external end of each riser with a main bus conductor mounted at the rear of the enclosure. The electrically conductive strap also includes a portion continuing past the external terminal of the associated riser to the end of the breaker casing. This continuation of the strap further extends around a portion of the end of the breaker casing and is connected to the opposite or internal end of the respective riser. The extended portion of the conductive strap therefore provides a conductive path which is electrically parallel to that of the riser. This additional path decreases the electrical resistance of the connections from the inside of the circuit breaker enclosure to the outside and since it is external of the breaker casing, increases the radiating surface of the path and improves dissipation of heat generated witihn the breaker without necessitating an enlargement of the enclosure.

Figure 2:
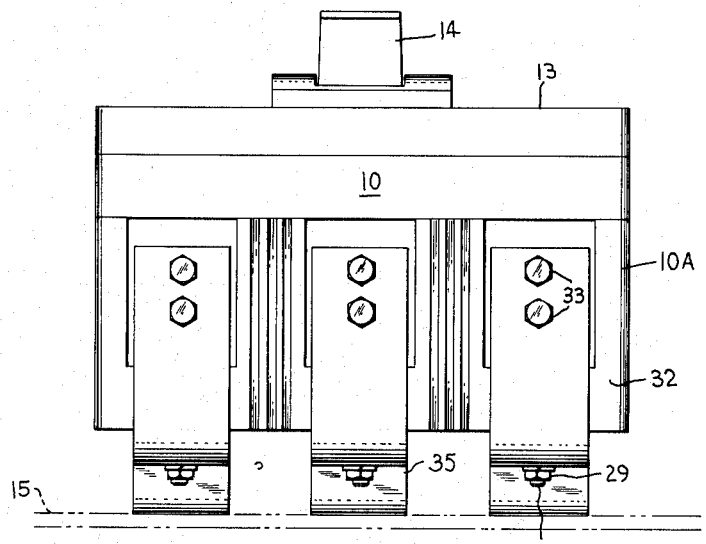

Further details of the invention as well as additional objects and advantages are set forth in the following more complete description taken in connection with the accompanying drawings wherein:

FIGURE 1 is a side elevation view partly broken away of an electric circuit breaker showing the electrical connections to main power bus bars behind the circuit breaker in accordance with this invention; and FIGURE 2 is an end elevation view of the assembly shown in FIGURE 1.

Referring now to the figures, a molded case circuit breaker 10 having a rectangular enclosure 10A of insulated material is shown positioned with a back surface 11 thereof adjacent a bus bar assembly 12. Through a front surface 13 of the enclosure 10A, a handle 14 extends, being movable back and forth across the front surface between discrete circuit-controlling positions. In the example illustrated, the external bus assembly 12 comprises three power-supplying main bus bars 15, 16 and 17. These are supported on insulators 20, 21 and 22, respectively, which are in turn attached to a backing member 23.

The exact nature of the circuit breaker device contained within enclosure 10A is immaterial to the present invention and the circuit breaker may or may not be associated with other circuit protective devices such as fuses. This invention is concerned with the manner in which the connections are made between terminal points on or within the enclosure and external conductors such as bus bars 15, 16 and 17. Typically, connections between terminals of circuit breakers and bus bars mounted behind the circuit breakers are made directly through the back of the circuit breaker enclosure. As the current-carrying capability of the circuit breaker increases, the size of the connections and the spacing between connections is generally required to be increased. Employing physically larger conductors, however, is not necessarily an optimum approach to the handling of larger electrical loads, since this entails substantially increased costs, greater difficulty of connection, and use of more space.

As best seen in FIGURE 1, electrical connection between an internal terminal strap 24 and a bus bar 15 is made through the medium of an electrically conductive riser assembly 26 which extends through an aperture 27 in the back surface of the enclosure, and a laminated connector strap 25. The riser has terminal areas on opposite ends to engage the respective conducting straps. A bolt 28 passing through the center of riser 26 and engaged at its opposite end by nut 29 clamps conductor strap 24 to the internal terminal area of riser 26 and connector strap 25 to the external conductive area of riser 26. At one end connector strap 25 is connected to bus bar 15 by means of a bolt 30 passing therethrough to clamp both elements firmly against insulator 20.

In accordance with the invention, an additional, parallel, current path is also provided. For this purpose the external connector strap 25 is extended beyond the external terminal area of conductive riser 26 along the back surface 11 of the enclosure to the end of the enclosure 10A, and is then bent 90° to lie along an adjacent end surface 32 of the enclosure 10A. At its outer end, the external connector strap 25 is clamped by connection screws 33 to an L-shaped electrically conductive strap 34. The latter extends to the end of the enclosure and is clamped to the internal terminal area of the riser assembly 26 by the bolt 28.

The extension of conductor strap 25 and its interconnection with lug 34 perform two positive functions. First, they provide an electrical path parallel to that of the riser 26 for the purpose of decreasing the total electrical resistance of the conductive path through the housing 10. Second, they provide a relatively massive heat radiating surface external of the enclosure to dissipate heat generated within the circuit breaker 10 or in the connection thereto. The circuit breaker shown, being of three-phase construction, is provided with similar connecting straps 35 and 36 for connection respectively to each of the two external bus bars 16 and 17. The invention is not, however, limited to use on the load side of a circuit breaker, but may be employed on the line side as well, and with non-automatic devices, such as switches.

While the invention has been shown and described in connection with but one preferred embodiment, it will be readily appreciated that certain modifications thereof may be made by those skilled in the art to which the invention pertains. The appended claims are, therefore, intended to cover all such modifications as fall within the true spirit and scope of the invention.

What I claim as new and desire to secure by Letters Patent of the United States is:

1. In combination:
   (a) an electrical device having a generally rectangular insulating enclosure having back and end surfaces;
   (b) terminal means carried by said enclosure having a first portion connected to a conductor extending within said device and having a second portion extending to said back surface of said enclosure;
   (c) an elongated electrical conductor having one end connected to said first portion of said terminal means and having an intermediate portion connected to said second portion of said terminal means, said conductor having its other end adapted for connection externally of said device;
   (d) the portion of said elongated electrical conductor between said one end and said intermediate portion extending beyond said end surface of said enclosure and being disposed and arranged to radiate heat from said device without obstruction by said enclosure.

2. In combination:
   (a) an electric switching device having a generally rectangular insulating enclosure having front, back, and end surfaces;
   (b) a conductive riser carried by said insulating enclosure and extending generally in a direction between said front and back surfaces adjacent said end surface of said enclosure, said riser having a first terminal portion at one end within said circuit breaker enclosure and a second terminal portion at the other end extending to said back surface;
   (c) an elongated conductive strap having one end portion connected to said first terminal portion of said riser, an intermediate portion connected to said second terminal portion of said riser, and its other end portion disposed and arranged for connection externally of said circuit breaker;
   (d) at least a portion of said conductive strap between said first and second terminal portions of said riser extending beyond said end surface of said enclosure;
   (e) whereby said intermediate portion of said conductive strap provides a path electrically in parallel with said riser and provides means positioned externally of said circuit breaker enclosure for dissipating heat generated within said enclosure.

3. In combination:
   (a) an electric circuit breaker having a generally rectangular insulating enclosure having front, back and end surfaces;
   (b) an electrically conductive riser carried by said insulating enclosure and extending generally in a direction between said front and back surfaces adjacent one of said end surfaces, said riser having a first terminal portion within said enclosure and electrically connected to an internal conductor of said circuit breaker and a second terminal portion extending to and available for connection at said back surface of said enclosure;
   (c) an elongated electrically conductive strap having an intermediate portion thereof connected to said second terminal portion of said riser, said intermediate portion of said conductive strap extending generally parallel to said back surface of said enclosure;
   (d) said conductive strap including an end portion extending substantially at right angles to said intermediate portion adjacent said end surface of said insulating enclosure, and electrical connecting means connecting said end portion of said conductive strap to said first terminal portion of said riser;
   (e) said conductive strap also including a second end portion disposed and arranged for connection to an electrical bus bar spaced from said back surface of said enclosure.

4. In combination, electrical apparatus as set forth in claim 3, wherein said means connecting said first end of said conductive strap to said first terminal portion of said riser comprises a generally L-shaped electrically conductive strap, said combination also including a single connecting means connecting both said L-shaped strap and said internal conductor to said first terminal portion of said riser and also connecting said intermediate portion of said conductive strap to said second terminal portion of said riser.

References Cited by the Examiner

UNITED STATES PATENTS 3,144,587  8/64  Darlow _____ 317—119

KATHLEEN H. CLAFFY, *Primary Examiner.*